United States Patent [19]
Green et al.

[11] 3,824,916
[45] July 23, 1974

[54] BACON COOKER

[75] Inventors: B. Sherman Green, Pacific Palisades; Charles K. Green, Malibu, both of Calif.; Jack L. Glancy; Floyd J. Myrick, both of Jackson, Miss.; Carl William Norlander, Canton, Miss.; Rodney E. Smith, Philadelphia, Miss.

[73] Assignee: Udico Electric Company, Canton, Miss.

[22] Filed: Dec. 30, 1971

[21] Appl. No.: 214,046

[52] U.S. Cl. ..................... 99/334, 99/337, 99/393, 99/425, 99/446
[51] Int. Cl. ..................... A47j 27/62, A47j 37/04
[58] Field of Search ..................... 99/334, 325–326, 99/327, 331, 337, 358, 390–391, 393, 425, 444, 446, 332, 333, 339, 340; 126/41

[56] References Cited
UNITED STATES PATENTS

| | | | |
|---|---|---|---|
| 1,301,197 | 4/1919 | Tully | 99/446 |
| 1,690,570 | 11/1928 | Dalbey | 99/425 |
| 1,859,004 | 5/1932 | Reich | 99/339 UX |
| 2,247,974 | 7/1941 | Thimblethorpe | 99/393 UX |
| 2,465,577 | 3/1949 | Cox | 99/326 UX |
| 2,630,062 | 3/1953 | Litt | 99/327 |
| 2,924,167 | 2/1960 | Rhodes | 99/337 |
| 3,002,444 | 10/1961 | Hoebing | 99/337 X |
| 3,127,828 | 4/1964 | Fine | 99/446 |
| 3,267,924 | 8/1966 | Payne | 99/446 X |
| 3,490,357 | 1/1970 | Lescure | 99/393 X |
| 3,593,648 | 7/1971 | Walters | 99/332 |
| 3,613,555 | 10/1971 | Ogman | 99/446 |
| 3,640,209 | 2/1972 | Wilson | 99/446 |

Primary Examiner—Harvey C. Hornsby
Assistant Examiner—Arthur O. Henderson
Attorney, Agent, or Firm—Robert R. Thornton

[57] ABSTRACT

Cooking apparatus, designed particularly for the cooking of bacon and the like, with an electrical resistance heating element. The electrical resistance heating element and associated cooking surface are contained within the apparatus so as to float vertically, resting upon the material being cooked. A cooking tray, upon which the material to be cooked is placed, and which has surface so as to permit the passage of grease there through, is supported beneath the cooking surface. The period of cooking is controlled automatically as a function of temperature and manually to select degree of doneness. Cooking is initiated and terminated by relative movement between the tray and the cooking surface.

9 Claims, 18 Drawing Figures

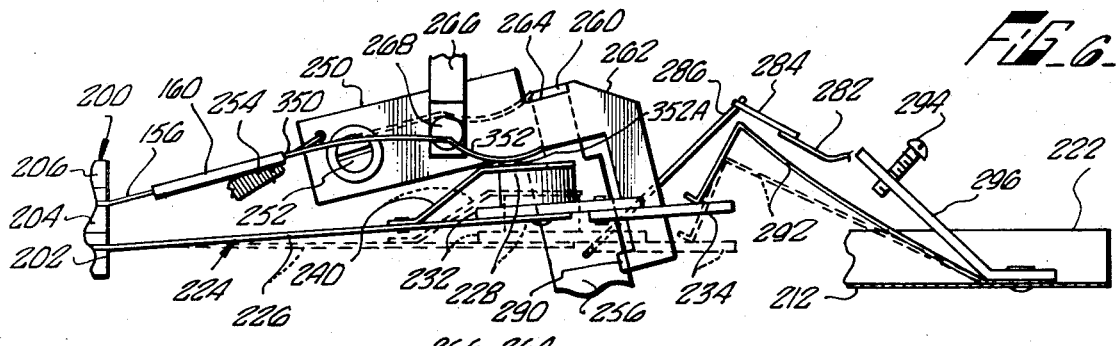
FIG_6
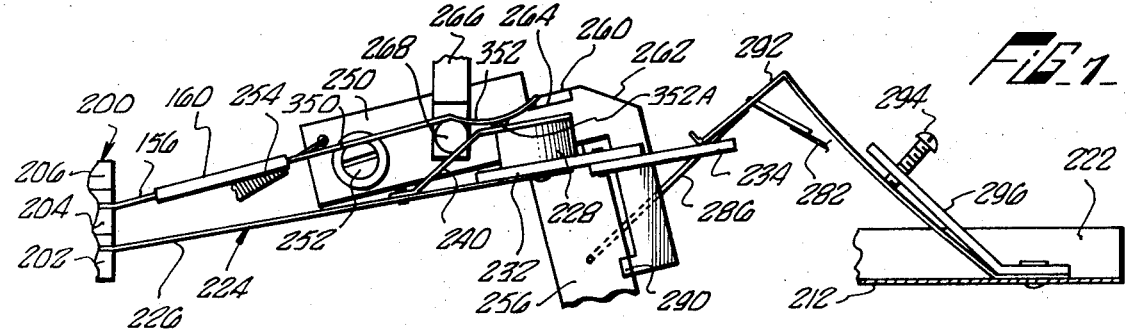
FIG_7
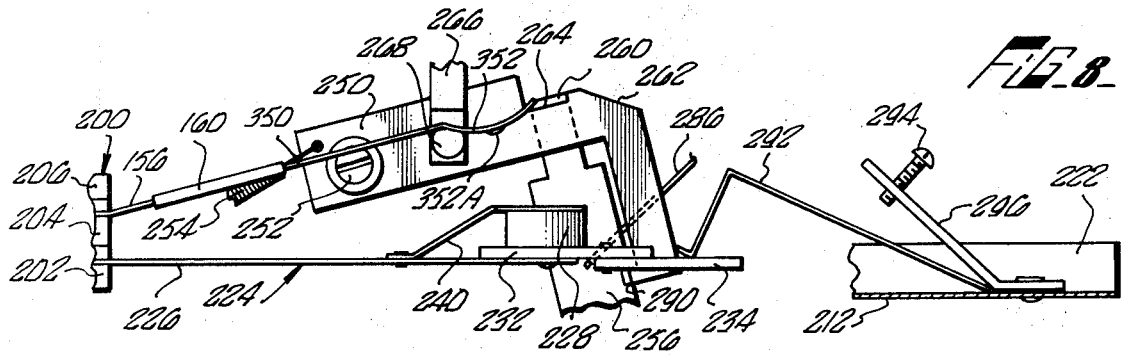
FIG_8
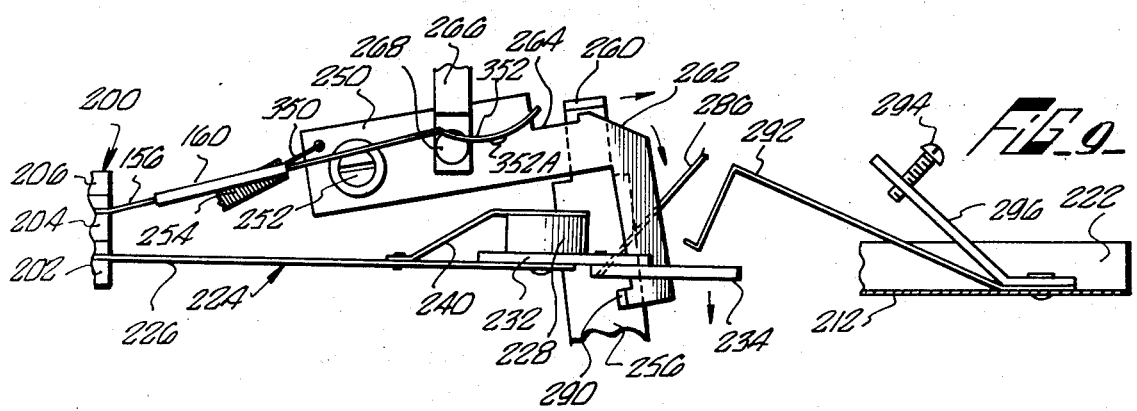
FIG_9

COOKING SURFACE - 300
BIMETALLIC STRIP - 156
AREA ABOVE BIMETALLIC STRIP
TIME IN INCHES

3,824,916

BACON COOKER

BACKGROUND OF THE INVENTION

1. Field of the Invention

This invention pertains to electric cookers, and more particularly to automatic electric cookers designed to cook thin sliced materials, such as bacon, hamburger patties, and the like.

2. Description of the Prior Art

Such devices have been known heretofore, and are shown, for example, in U.S. Pat. No. 3,010,383 and U.S. Pat. No. 3,366,035. However, for various reasons, such as bulk, weight, complexity, and the like, such devices have not gained widespread public acceptance. One of the principal shortcomings of such devices is that, although designed with the objective of rapidly removing the fat cooked from the meat, such devices have, in practice, allowed the meat, for a considerable period of time, to cook in its own fat and, so, have shown little practical advantage, as far as ultimate food quality is concerned, over similar foods cooked in a skillet.

SUMMARY OF THE INVENTION

According to the present invention, a cooking apparatus, particularly suitable for cooking bacon and the like, has a frame, within which is a cooking element of the electrical resistance type and having a cooking surface. The cooking tray, having a good supporting surface adapted to permit the passage of grease or fat from the meat during cooking therethrough is connected to the frame for supporting the tray so as to permit relative movement between a first or open position, in which the tray is remote from the cooking surface, and a second or closed position, in which the tray is disposed under and adjacent to the cooking surface, whereby, when in this second position, the meat being cooked rests on the cooking tray and supports the cooking surface, which is then floating.

In the preferred embodiment, the apparatus includes a control means for controlling the application of electrical energy to the resistance element in response to the movement of the tray into the second position, the cooking element control means controlling the time interval during which electrical energy is applied to the resistance element. The cooking element control means automatically compensates for the variation in warm up time for the electrical resistance heating element as a function of whether cooking is initiated from a "cold start" or is initiated immediately after the completion of a preceeding cooking cycle, thus automatically controlling cooking time as a function of cooking element temperature. The control means also provides means to selectively vary the cooking time and a manually operated override of the control means to terminate cooking and retain the apparatus in its open position.

BRIEF DESCRIPTION OF THE DRAWING

The invention may be more readily understood by referring to the accompanying drawings in which:

FIG. 6 is a side elevation, partially in section, of the heater control means shown in FIG. 2, illustrating the control means operation during the first portion of the control cycle;

FIG. 7 illiustrates the control means of FIG. 6 during the second portion of its cycle;

FIG. 8 illustrates the control means of FIG. 6 during the third portion of its cycle;

FIG. 9 illustrates the control means of FIG. 6 during the fourth portion of its cycle;

DESCRIPTION OF THE PREFERRED EMBODIMENT

Figure 1:
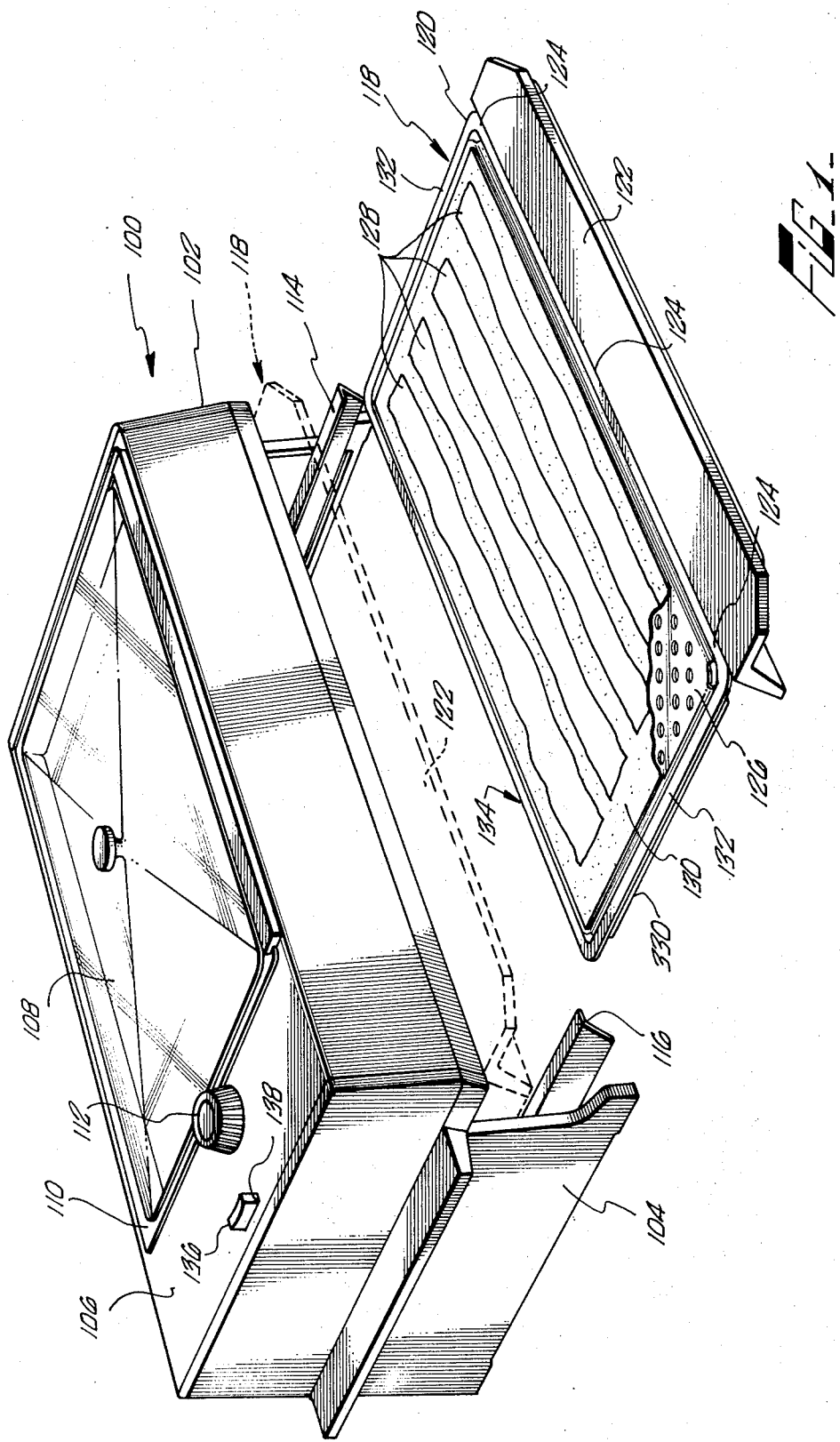
FIG. 1 is a view of the cooking apparatus of the present invention, showing the tray assembly removed from the apparatus proper.

Referring now to FIG. 1, there is shown an isometric view of the cooking apparatus according to the present invention. In FIG. 1, a cooker 100 for bacon or the like, has two side panels 102, 104 and a cover 106. The cover 106 extends from the back side of the cooker 100 around the top and down a portion of the front side. In the top of the cooker there is shown a clear plastic or glass cover 108 which covers a warming tray 110 disposed in a recess found in the cover 106. Also on the top is a heat control knob 112, the purpose of which will be described hereinafter. Extending outwardly from the lower front portion of the cooker 100 are a pair of tray supports 114, 116. The tray supports are shown in their lowered position. A cooking tray 118 is shown as removed from the cooking apparatus 100 and consists of a tray base 120, a tray handle 122 attached to the base 120 by means of screws 124, and a rack 126 which rests in the base 120. The rack 126 has a series of apertures formed therein so as to permit the passage of grease or fat through the rack into the base. Thus, the base forms a storage reservoir for grease and fat during cooking. As seen in FIG. 1, four strips of bacon 128 are supported by the rack 126 and separated from them by a layer of absorbent paper 130. The paper 130 may, for example, be several plies of paper toweling.

In FIG. 1, the tray 118 is shown as removed from the cooker 100 and, as will be apparent, is supported within the cooker 100 by tray flange portions 132, formed at the sides of the base 120, as part of a peripheral flange 134. The flange portions 132 rest upon the tray supports 114 and 116. As will become apparent with respect to the description of the structures shown in FIGS. 3 and 4, the tray, when inserted within the cooker and supported by the tray supports 114, 116, can be moved into an upper position, as shown in FIG. 4, and as is shown in FIG. 1 in dotted lines. A manual release knob 136 is disposed over an aperture 138 in the cover 106 adjacent the control knob 112. The manual release knob 136 may be pressed to cause the tray 118 to be shifted from the upper position shown in dotted lines in FIG. 1 to its lowered position.

Figure 2:
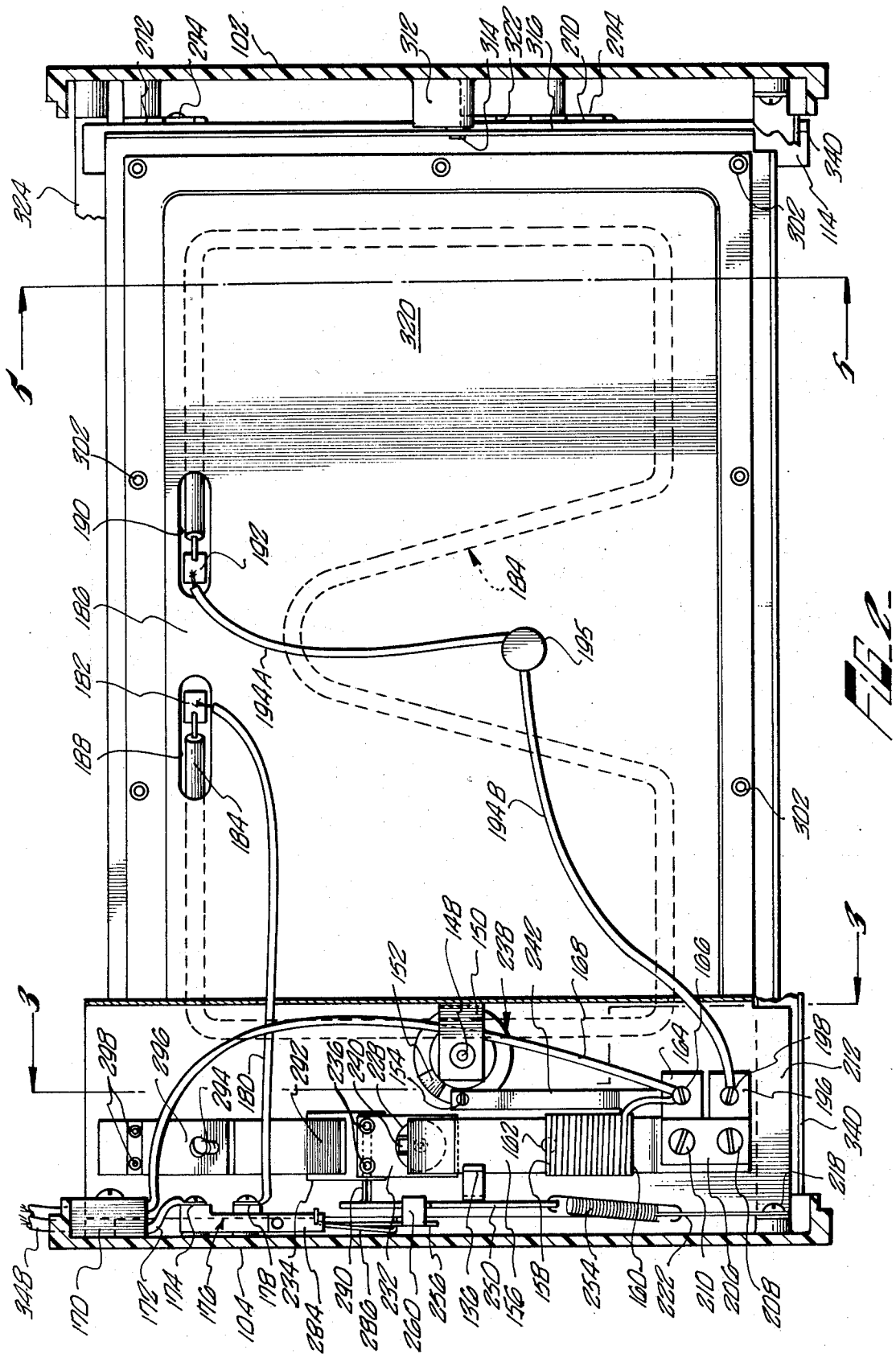
FIG. 2 is a plan view, in section, of the cooking apparatus of FIG. 1.

Referring now to FIG. 2, there is shown a top elevation of the cooker 100 with the cover 106 removed, so as to, in effect, constitute a top sectional view of the cooker. A stem 148, to which the heat control knob 112 (FIG. 1) is attached, is held in position by a guide 150 and terminates in a camming surface 152, on which a camming bolt 154 rides. The camming bolt is initially set, as will be explained hereinafter with respect to FIG. 10 and thereafter adjusted, as will be explained hereinafter with respect to FIG. 11, to control the duration of the first period of the cooking cycle.

Also shown in FIG. 2 is a bimetallic strip 156 having a heating winding 158 wound about a portion thereof. The heating winding 158 is electrically insulated from the bimetallic strip by means of a mica wrapping 160. At one end, the heating winding 158 is connected to the bimetallic strip 156 by a rivet 162. At its other end, the heating winding 158 is attached to a terminal lug 164 by a bolt 166. Also attached to the terminal lug 164 by the bolt 166 is an electrical conductor 168, the opposite end of which is attached to an input power terminal block 170 to which the electrical power input is applied by a conventional two-wire system, as is seen more clearly in FIG. 3. An electrical conductor 172 is connected between the input power terminal block 170 and the input terminal 174 of a switch 176. The switch 176 has an output terminal 178 to which an electrical conductor 180 is connected. At its opposite end, the electrical conductor 180 is connected to a terminal 182 of an electrical resistance heating element 184. A cover plate 186 covers the heating element 184, which extends, at its ends, through a pair of apertures 188, 190 therein. The heating element 184 also has a second terminal 192 to which an electrical conductor 194A is connected. The conductor 194A terminates at a standard bimetal type thermostat 195, whose contacts open at 450° Fahrenheit to open an electric circuit for the heating element 184. Also connected to the thermostat 195 is an electrical conductor 194B, which terminates at a second terminal lug 196, to which it is connected by means of a bolt 198. Thus, electrical circuit continuity exists from the input power terminal block 170 through the electrical conductor 168 to terminal lug 164 and through the heating winding 158 to the bimetallic strip 156. When the thermostat 195 is closed, electrical circuit continuity also exists from the input power terminal block 170 through conductor 172 and the switch 176 and conductor 180 to the electrical resistance heating element 184 and from the electric resistance heating element 184 through the conductor 194A, thermostat 195, conductor 194B to terminal lug 196.

Figure 3:
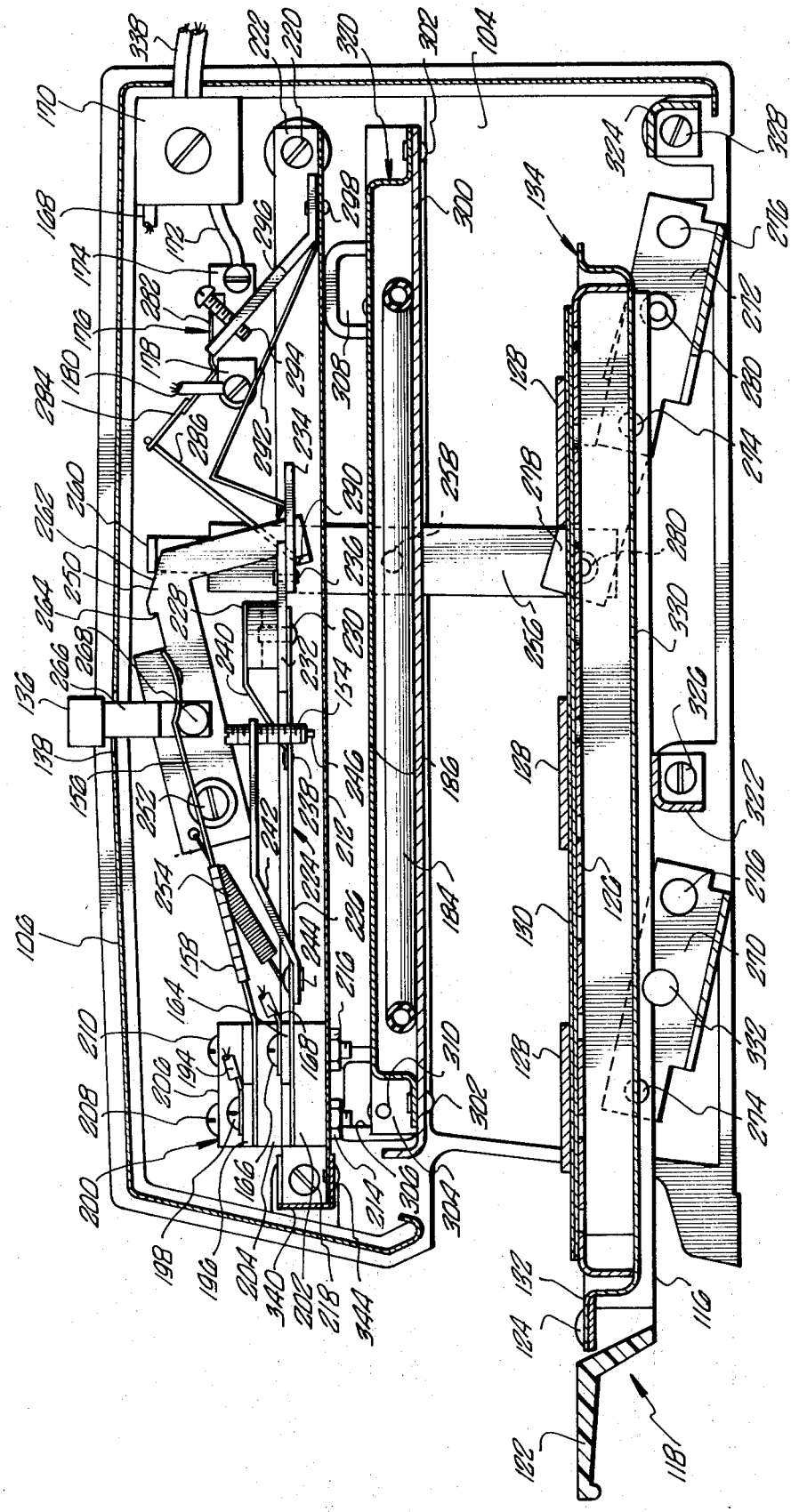
FIG. 3 is a sectional view taken along lines 3—3 of FIG. 2 and showing the cooking apparatus with the tray in its open position but inserted in the apparatus.
Figure 4:
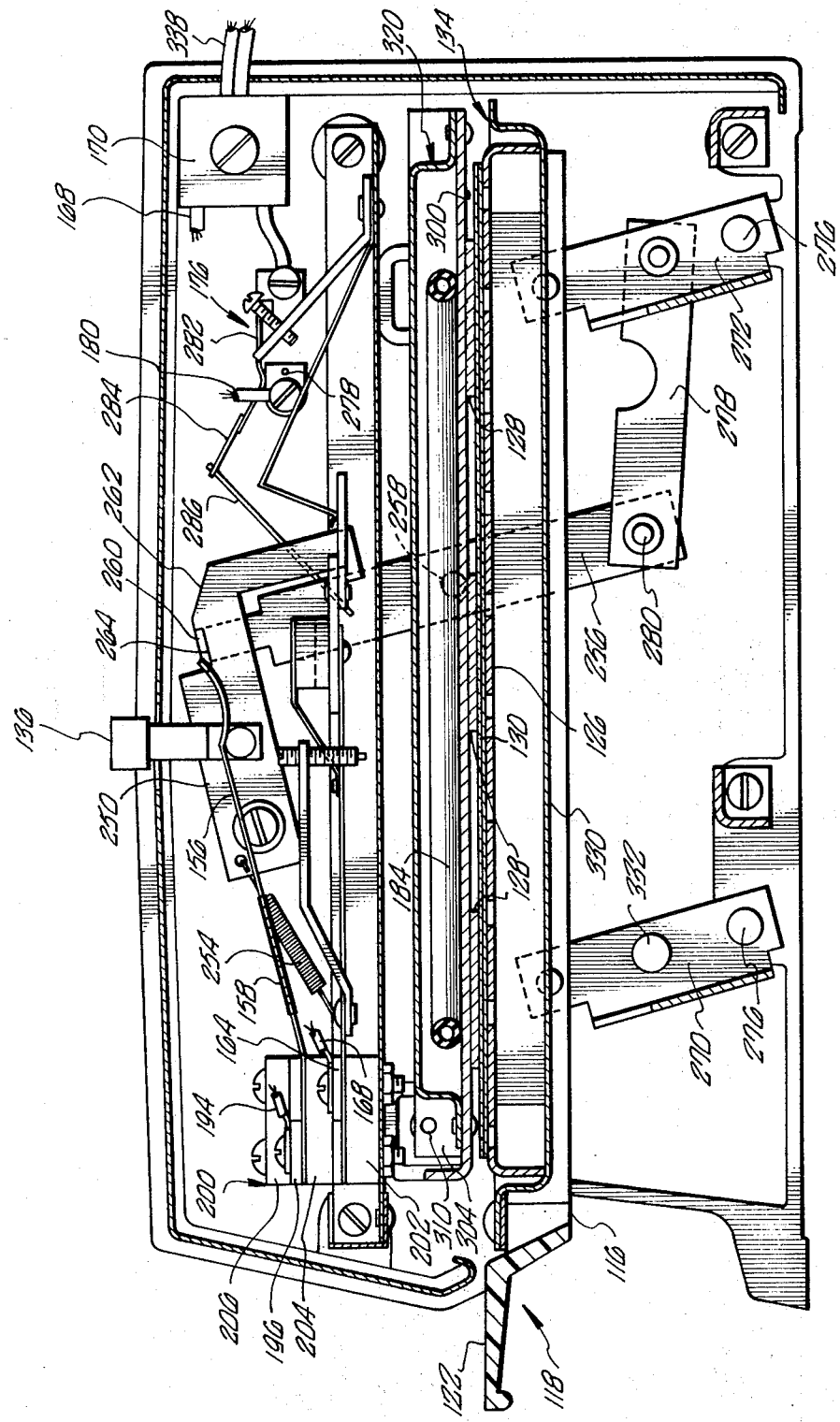
FIG. 4 is a sectional view of the cooking apparatus of FIG. 3, but with the tray in its closed position.

Referring now to FIG. 3 there is shown, in section, a view of the cooker taken generally along lines 3—3 of FIG. 2, but with the cover 106 in place and the tray 118 inserted in the cooker. The cooker is in the open position shown in FIG. 1. Certain of the elements shown in FIG. 2 have been omitted in FIG. 3 for purposes of clarity of depiction. For example, the connection of the heating winding 158 to the terminal lug 164 is not shown, nor is the rivet 162 which connects the heating winding 158 to the bimetallic strip 156.

As is seen in FIG. 3, terminal lugs 196, 164 are part of a terminal assembly 200, which consists of three insulator blocks 202, 204 and 206, connected together by a pair of bolts 208, 210 which extend through appropriate apertures therein and are fastened to a mounting plate 212 by a pair of nuts 214, 216. The mounting plate 212 is fastened to the side panel 104 by a pair of bolts 218, 220, which extend through a flange 222 formed at the edge of the mounting plate 112.

Extending from the terminal assembly 200 between the terminal lug 164 and the insulating block 202 is a latch release actuator arm assembly 224 consisting of a cantilever arm 226 of spring steel. A permanent magnet 228, is attached to the cantilever arm 226 by a rivet 230 so as to fasten an insulating arm 232 therebetween, and a striker arm 234 attached to the insulator arm 232 by a pair of rivets 236 (only one of which is shown in FIG. 3). Also attached to the cantilever arm 226 by a rivet 238 is a copper contact arm 240. A bias adjustment arm 242 is attached to the cantilever arm 236 adjacent the terminal assembly 200 by a rivet 244. The camming bolt 154 extends through the bias adjustment arm 242. The camming bolt 154 has an insulated tip 246. The insulated tip 246 rides on the camming surface 152. For purposes of clarity, the camming surface is not shown in FIG. 3, see FIG. 11.

A latch 250 is pivotally attached to the side panel 104 by a bolt 252 which extends through an aperture formed in the latch 250. A latch bias spring 254 is connected between the latch 250 and flange 222, by appropriate apertures formed in each thereof, so as to bias as the latch 250 in a counterclockwise direction. A latch lever 256 is also pivotally attached to the side panel 104 by a bolt 258, shown in dotted lines in FIG. 3. In the disposition shown in FIG. 3, a latch arm 260, contacts a shoulder portion 262 of the latch adjacent a latch recess 264. The latch arm 260 extends perpendicularly outward from the latch lever 256 and is complimentary with the latch recess 264, as will be apparent in FIG. 4. When in the disposition shown in FIG. 3, the latch arm limits the counterclockwise movement of the latch 250. A manual release arm 266 is attached to the latch 250 by a rivet 268 and extends through the aperture 138 in the cover 106, terminating in the manual release knob 136.

The tray support 116 is connected to the side panel 104 by means of a front pivot member 270 and a rear pivot member 272. The pivot members 270, 272, extend transversely across the width of the cooking apparatus. The front and rear pivot members 270, 272 are pivotally attached to the tray support 116 by rivets 274 having apertures through which bosses 276, formed in the side panel 104, extend to pivotally connect the front and rear pivot members to the side panel 104.

The latch lever 256 is connected to the rear pivot member 272 by means of a crank arm 278. The crank arm 278 is pivotally attached to the latch lever 256 and to the rear pivot member 272 by rivets 280.

The switch 176 has a switch arm 282 which is attached to the input terminal 174 and extends adjacent the output terminal 178. The switch arm 282 is made of electrically conductive material. An electrically insulating switch arm extension 284 is attached to the switch arm 282 and has an aperture formed therein through which a switch actuator arm 286 passes. The actuator arm 286 also passes through an aperture in the latch lever 256, so as to be connected between the latch lever 256 and the switch arm extension 284. The switch arm 282 is normally biased away from the output terminal 178. The actuator arm 286 limits clockwise motion of the arm 282 in response to this biasing.

The latch 250 has an automatic release arm 290 formed at the lower extremity thereof, perpendicular to the remainder of the latch so as to extend outwardly therefrom. As seen in FIG. 3, the automatic release arm is disposed immediately below the insulating arm 234 in the release actuator arm assembly and is in contact therewith. The release actuator arm assembly is biased in a counterclockwise direction, so as to be in contact with the automatic release arm 290, by means of a release bias spring 292, seen in FIG. 3 to be of the leaf type. A release bias set screw 294 threadably engages an aperture in a release bias set arm 296. The release bias set arm 296 and the release bias spring 292 are attached to the mounting plate 212 by a rivet 298. The function of the release bias spring will be described in detail with respect to FIGS. 6 through 9.

The electrical resistance heating element 184 is enclosed between the cover plate 186 and a lower plate or cooking surface 300. The cover plate 186 and cooking surface 300 are attached together by rivets 302. The cooking surface 300 has a side flange 304 formed adjacent the side panel 104. A pair of hollow bosses 306, 308 are formed in the side panel 104 adjacent the front and rear thereof. A mounting pin 310 is attached to the cooking surface flange 304 at the front portion thereof and extends outwardly therefrom so as to be disposed within the hollow bosses 306. A similar pin (not shown) is attached at the rear portion of the flange 304 and extends into the rear hollow bosses 308. A similar hollow boss 312 is formed in the side panel 102 and a mounting pin 314, attached to the flange 316 formed on the opposite side of the cooking surface flange 306 (see FIGS. 2 and 5). The cooking surface 300, together with the electrical resistance heating element 184 and cover plate 186, constitute a cooking element 320, which is generally fixed within the cooking apparatus, but may be moved, to an extent limited by the boss inner diameters, either vertically or horizontally. Normally, under the influence of gravity, the mounting pins rest in the lowermost portion of the hollow bosses.

Also shown in FIG. 3 are a pair of lateral support members 322 and 324 at the base of the cooking apparatus. The lateral support members 322, 324 are attached to the side panel 104 by bolts 326, 328 and serve to provide lateral rigidity for the cooking apparatus as well as further connecting together the side panels 102, 104.

As will be seen from FIG. 3 the cooking surface 300 divides the apparatus generally into an upper portion, which is enclosed by the cover 106 and which contains the heating, timing, and latching mechanisms, and a lower portion, which is open at the front of the device for receiving the cooking tray 118 and contains, in general, no structure other than the pivotal support for the cooking tray and the pivotal connection for the latch lever. The cooking tray 118 has a base portion 330, which is separated from the rack 126 so as to form a hollow space therebetween, utilized, for example, for receiving grease cooked from the material during cooking. The rack 126 is preferably not attached to the bias plate 116, and may readily be removed for washing, emptying grease from the base plate, and the like.

Referring now to FIG. 4, the cooking apparatus of FIG. 3 is shown in the cooking or latched position. In FIG. 4, it will be seen that the latch arm 260 has engaged the latch recess 264 by being moved counterclockwise along the shoulder 262, forcing the latch 250 to move in a clockwise direction against the urging of the latch bias spring 254 so that the mechanism is latched. The latch arm 260 is moved in the counterclockwise direction by movement of the crank arm 278 toward the rear of the apparatus in response to the pivotal movement of the rear pivot member 272. The pivotal movement of the rear pivot member 272 is initiated by pushing the cooking tray 118 into the interior of the cooking apparatus, causing the tray supports 116 to move rearwardly and upwardly and carrying the tray 118 along therewith. Therefore, in the disposition shown in FIG. 4, the tray is held adjacent the cooking surface 300, whereas in the disposition shown in FIG. 3, the cooking tray 118 is held remote from the cooking surface 300. A tray support stop 332, which is attached to the front pivot member 270, limits The downward movement of the tray support 116 so as to fix the lowered position of the tray 118.

The counterclockwise movement of the latch arm 260 is produced by the general counterclockwise rotation of the latch lever 256. This counterclockwise rotation of the latch lever 256 is also transmitted through the actuator arm 286 and switch arm extension 284 to the switch arm 282, thereby bringing the switch arm 282 down so as to be in contact with the output terminal 278. Consequently, electrical power, supplied to the terminal block 170 by means of an input power line 338 will be supplied through electrical lead 168 to the terminal lug 164, then through the heating winding 158 to the bimetallic strip 156 and consequently through the second terminal lug 196 and electrical conductor 194 to the terminal 192 of the electrical resistance heating element 184. Electrical power supplied from the terminal block 170 to the switch 176 is supplied through electrical conductor 180 to the other input terminal 182 of the electrical resistance heating element. The electrical resistance heating element will then heat up, causing the cooking surface 300 to become heated, and thereby cooking of the material 128 resting on the absorbent paper 130 on the cooking tray 118. So long as the latch arm and latch are in the disposition shown in FIG. 4, electrical power will continue to be supplied to the electrical resistance heating element 184.

As was mentioned heretofore with respect to FIG. 3, the cooking element 320 is free to move, to a limited extent both horizontally and vertically. By comparison of the disposition of the cooking element in FIG. 3 with that in FIG. 4, it will be seen that the cooking element has been moved upwardly and rearwardly in FIG. 4 from the disposition shown in FIG. 3 so that the cooking element, in FIG. 4, is "floating" and is supported by the bacon 128, rather than being supported by the mounting pins attached to the flange 304, 316.

Figure 5:
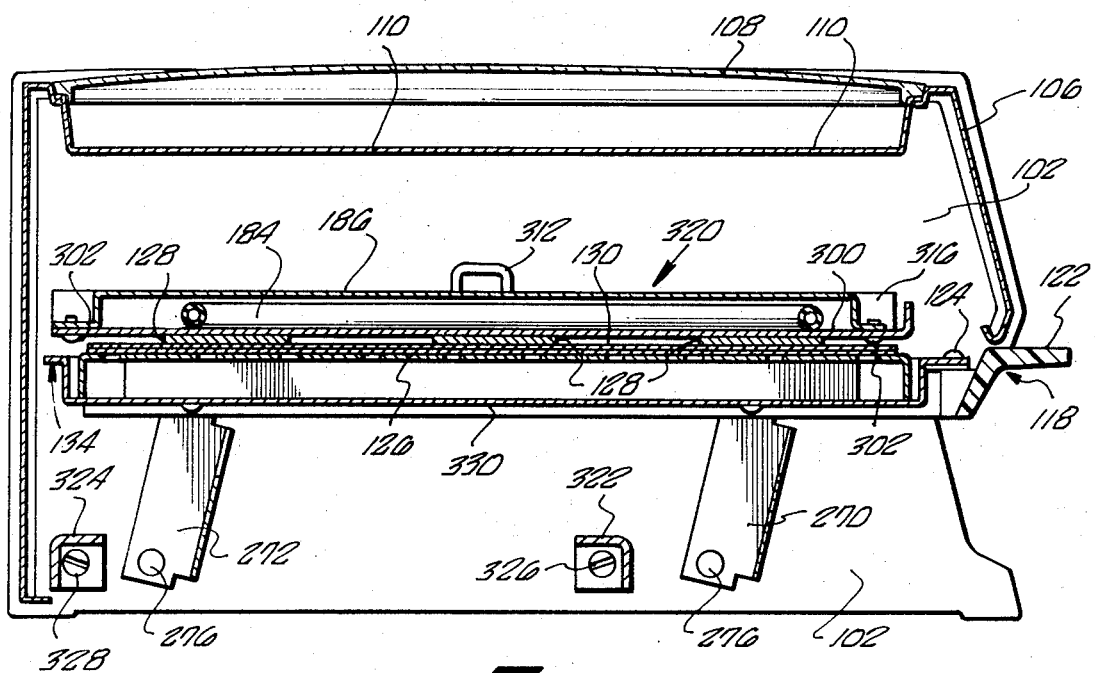
FIG. 5 is a sectional view of the cooking apparatus taken along lines 5—5 of FIG. 2.

Referring now to FIG. 5, there is shown a view, in section, of the cooking apparatus taken generally along lines 5—5 of FIG. 2, but with the tray in the raised position shown in FIG. 4. In FIG. 5, the warming tray 110 and plastic cover 108 are shown in cross section. At the front of the cooker, between and forward of the cooking element 320 and the warming tray 110, is an upper lateral support member 340 which is attached to the side panel 102 by a bolt 342. The upper lateral support member 340 extends across the inner front portion of the cooking apparatus and is attached to the mounting plate 212 by a rivet 344 and is attached to the side panel 104 by the bolt 218. The side panels 102, 104, lateral support member 322, 324 and upper lateral support member 340 comprise a frame for the bacon cooker, to which the other major components are connected and from which the cooking element 320 is supported.

Referring now to FIGS. 6 through 9, the operation of the timing mechanism of the apparatus will be described. Referring first to FIG. 6, the timing mechanism and latching assembly are shown in dotted lines in the disposition of FIG. 4. The bimetallic strip 156 is seen to consist of an arm portion 350 which terminates in a curved contact portion 352 having a silver plated contact rivet 354. When electrical energy is applied to the heating winding 160, the bimetallic strip 156 is heated, causing the arm portion 350 to bend downwardly, thereby moving the contact portion 352 adjacent the copper contact arm 240 attached to the cantilever arm 226 at the permanent magnet 228. When the contact portion 352 is sufficiently close to the permanent magnet 228, magnetic attraction causes the cantilever arm 226 to pivot upwardly from the terminal block 200, so that the copper contact arm 240 contacts the contact rivet 354 on the bimetallic strip. The mechanism has now assumed the position shown by the solid lines of FIG. 6.

It will be noted that the cantilever arm 226 pivots against the biasing of the release bias spring 292. When the copper contact arm and the contact portion of the bimetallic strip are in contact as shown in FIG. 6, the heating winding 160 is shorted by an electrical circuit from the terminal lug 164 through the cantilever arm 226, the copper contact arm 240, and the bimetallic strip 156. Thus, the heating winding no longer heats the bimetallic strip. As the bimetallic strip cools, it slowly returns to its original position, as shown in the dotted lines of FIG. 6.

When the bimetallic strip 156 has cooled sufficiently to approach its original position the cantilever arm 226 is raised to the positions shown in FIG. 7. The release bias spring 292 urges the cantilever arm downwardly, away from the bimetallic strip 156 through contact with the striker arm 234. The release bias spring 292 is in contact with the release bias set screw 294. It will be apparent that the amount of biasing applied by the release bias spring 292 to the cantilever arm is present by an adjustment of the release bias set screw 294. This bias is adjusted to control the duration of the time interval which commences with the shorting out of the heating winding 160 by contact between the bimetallic strip 156 and the copper contact arm 240 (FIG. 6) and terminates when the release bias spring 292 overcomes the magnetic attraction between the bimetallic strip 156 and the permanent magnet 228, whereupon the cantilever arm pivots downwardly, as is shown in FIG. 8, so that the striker arm 234 strikes the automatic release arm 290 of the latch 250.

FIG. 8 illustrates the disposition of the various components of the latching and timing mechanisms at the instant that the striker arm 234 strikes the automatic release arm 290. Since the striker arm 234 is moving at the time it strikes the automatic release arm 290, this motion will be transferred to the automatic release arm 290, causing the latch 250, of which the automatic release arm forms a part, to pivot clockwise about the bolt 252, thereby moving the latch recess 264 downwardly away from the latch arm 260. When the latch recess 264 moves away from the latch arm 260, the latch arm 260, and therefore the latch lever 256 to which it is attached, pivot clockwise in response to the weight of the tray 118, and tray supports 114, 116, the tray support 116 being linked through the crank arm 278 and the pivot member 272 to the latch lever 256.

As is shown in FIG. 9, the latch arm 260 clears the latch 250 and pivots to the position shown in FIG. 3. The release of the latch arm 260 from the latch recess 264 permits the tray 218 to drop to the position shown in FIG. 3. Under the biasing of the latch bias spring 254, the latch 250, after completing its clockwise rotation, rotates counterclockwise until the shoulder 252 is stopped by the latch arm 260, as is shown in FIG. 3. The tray may then be drawn from the cooking apparatus and the cooked material removed therefrom.

Figure 10:
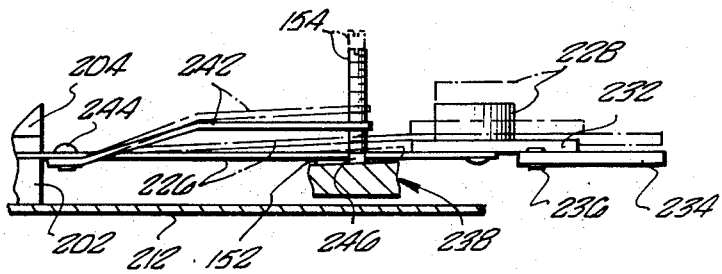
FIG. 10 illustrates the structure by which the duration of cooking may be manually varied.

FIG. 10 illustrates the structure and method by which the duration of the period of application of electrical energy to the heating winding 158 is set. As was explained heretofore with respect to FIGS. 6 through 9, electrical energy is applied to the heating winding 158, after cooker energization, until such time as the contact rivet 354 on the bimetallic strip 156 contacts the copper contact arm 240 attached to the cantilever arm 226 to short-circuit the heating winding 158. The heating of the bimetallic strip 156 by the heating winding 158 causes the curved contact portion 352 to gradually approach the permanent magnet 228. Upon the curved contact portion 352 reaching a point from the permanent magnet 228 determined by the magnetic attraction exerted by the permanent magnet 228 and the stiffness of the cantilever arm 226, the cantilever arm 226 pivots upwardly toward the bimetallic strip 156 and the heating winding 160 is shorted out. The cantilever arm 226 is carried with the bimetallic strip 156 as the cooling bimetallic strip 156 moves upwardly. Varying the initial location of the permanent magnet 228, with respect to its distance from the bimetallic strip 156, controls the time required to heat the bimetallic strip 156 to cause sufficient downward deflection of the curved contact portion 352.

As is seen in FIG. 10, the camming bolt 154 passes through the bias adjustment arm 242 and contacts the camming surface 252. The insulated tip 246, attached to the camming bolt 154, provides electrical insulation of the bias adjustment arm 242, and consequently the cantilever arm 226, from the camming surface 152. As the camming bolt 154 threadably engages the bias adjustment arm 242, rotation of the camming bolt will cause the bias adjustment arm, and consequently the cantilever arm 226, to either be raised or lowered, depending upon the direction of rotation of the camming bolt 154. Thus, as is shown in FIG. 10, the permanent magnet 228 may have an initial position, shown in dotted lines, which is fixed by adjustment of the camming bolt 154. The position may be changed to that shown in solid lines by rotation of the camming bolt, so as to lower the bias adjustment arm 242, and consequently lower the cantilever arm 226 to which the permanent magnet 228 is attached. If the permanent magnet position is so lowered, the duration of the application of electrical energy to the heating winding 160 will be increased, as a result of the greater deflection required of the bimetallic strip in order for the curved contact portion 352 to reach the required proximity of the permanent magnet 228. Consequently, lowering the position of the permanent magnet 228, as shown by the solid lines in FIG. 10, will result in an increase in the period of time during which electrical energy is applied to the electrical resistance heating element 184, and the material being cooked will be cooked to greater doneness. Conversely, if the position of the permanent magnet 228 is raised, the material being cooked will be cooked a shorter period of time, and so be less done.

Figure 11:
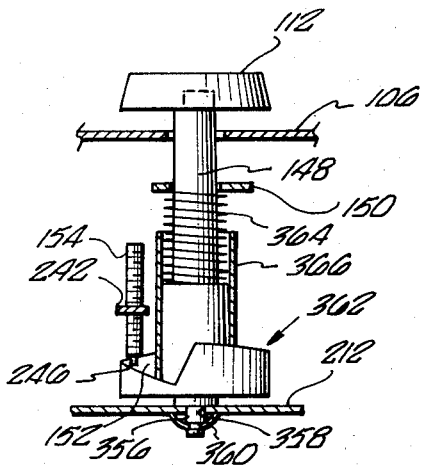
FIG. 11 illustrates, in greater detail, the structure of FIG. 10.

In FIG. 11, the control knob 112, for varying manually the duration of cooking time, together with its associated components, are shown. The control knob 112 is attached to the stem 148, which extends through the cover 106 and is held in position by the guide 150. The lower portion of the stem 148 terminates in a tip 356 which extends through an aperture 358 formed in the mounting plate 212. The tip 356, and consequently the stem 148, are held in position with respect to the mounting plate 212 by a lock washer 360. The lock washer 360 is attached to the tip 356 and covers the aperture 358 so as to ride against the mounting plate 212 on the opposite side thereof from the stem 148. Around the base of the stem there is an enlarged portion 362 having the camming surface 152 formed on the upper side thereof. The insulated tip 246 of the camming bolt 154 rides on the camming surface 152. As will be apparent, rotation of the control knob 112 will rotate the stem 148, causing the enlarged portion 362 to rotate, therefore either raising or lowering the camming bolt 154 and consequently the bias adjustment arm 142, by changing the location of the insulated tip 246 on the camming surface 152. Therefore, the control knob and associated components comprise a structure for manually varying the duration of heating of the bimetallic strip about a base period of heating time which may be selectively varied by adjustment of the camming bolt to provide a base heating time. The control knob then sets the limits of variation of the heating time about this base heating time. A bias spring 364 enclosed by an insulating fiberglass sleeve 366, provides sufficient friction to hold the stem 148 fixed in position against inadvertent movement, so as to maintain the heating time setting.

As was pointed out heretofore, the release bias screw 249 is adjustable to control the amount of bias applied by the release bias spring 292 to the cantilever arm 226, and consequently to provide a second control over the duration of the application of electrical energy to the electrical resistance heater element 148. The release bias screw 294, and the camming bolt 154, are preadjusted to provide the desired base duration of heating. This base duration of heating is divided into two periods, that during which the heating winding 158 heats the bimetallic arm 156 and that during which the heating winding 158 is shorted out and the bimetallic arm 156 is cooling. These two periods are variable independent of one another. Further, the control knob may vary the duration of the first period about the base period. The control knob can not vary the duration of the second period, which is controlled solely by the release bias spring 292 and the bias applied thereby, which is adjusted by the release bias screw 294.

Figure 12:
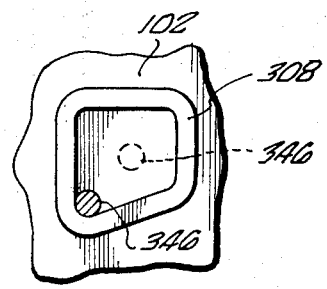
FIG. 12 illustrates the structure by which the cooking surface is supported from the frame so as to be floating during cooking.

FIG. 12 shows the structure by which the rear portion of the cooking element 320 is associated with the side panel 104. A mounting pin 346, which is identical with the mounting pin 310 of FIG. 3 and the mounting pin 314 of FIG. 2, is shown in Section. The mounting pin 346 is shown in solid lines when the cooking element 320 is in the disposition shown in FIG. 3, and is shown in dotted lines when the cooking element 320 is in the disposition shown in FIG. 4. As will be apparent, in both dispositions the mounting pin 346 is contained within the hollow boss 308. However, when the cooking element 320 is in the disposition shown in FIG. 4, the mounting pin 346 does not contact the inner surface of the hollow boss 308 to provide support for the cooking element 320. Rather, the cooking element 320 floats, and is supported by the bacon or other material being cooked. On the other hand, when the cooking element is in the disposition shown in FIG. 3, so that it is not being supported by any material being cooked, the pin 346 rests against the lower inner surface of the hollow boss 308, so as to provide support for the cooking element 320. The mounting pins 310, 314 function in the same manner with their associated bosses 306, 314, respectively.

Figure 13:
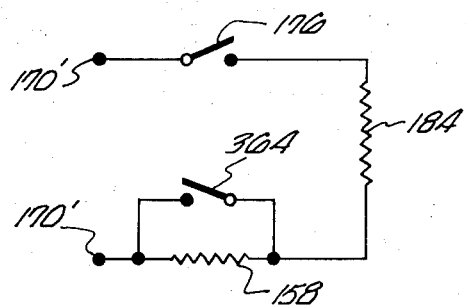
FIG. 13 is a schematic diagram of the electrical circuitry of the cooking apparatus.

Referring now to FIG. 13, there is shown a schematic diagram of the electrical circuit of the cooker in functional form. The input power terminal block 170 is shown as a pair of input terminals 170'. The heating winding 158 is shown as being bypassed by a normally open switch 364 which, when closed, shortcircuits the heating winding 158. From the previous description, it will be apparent that the normally open switch 364 corresponds to the electrical circuit from the input terminal lug 164 through the cantilever arm 226, the copper contact arm 240 and the bimetallic strip 156. The switch 176, when closed, provides circuit continuity between the input terminals 170' and the electrical resistance heating element 184.

Figure 14:
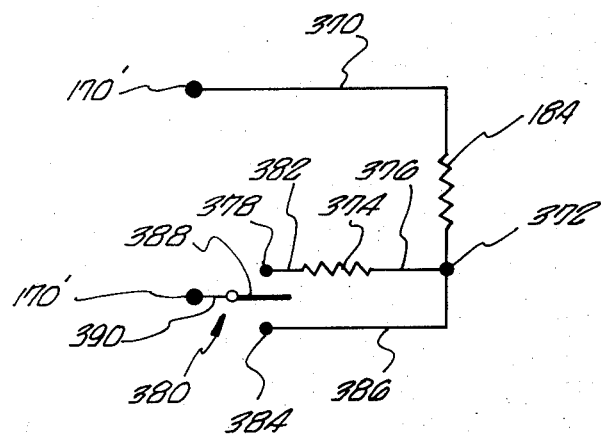
FIG. 14 is a schematic diagram of an alternate embodiment of electrical circuitry for the cooking apparatus.

FIG. 14 is a schematic diagram of an alternate embodiment of the electrical circuit of the cooker in functional form. In FIG. 14, the electrical resistance heating element 184 is connected to one of the input terminals 170' directly by a conductor 370. At its opposite end, the electrical resistance heating element 184 is connected to a terminal 372. A bimetal heater element 374 is connected to the terminal 372 by a conductor 376, and to a contact 378 of a three position switch 380 by a conductor 382. The switch 380 has a second contact 384 which is connected to the terminal 372 by a conductor 386. The switch has an arm 388 which is connected to the other of the input terminals 170' by a conductor 390. As will be apparent from FIG. 4, when the switch 380 is in the position shown, application of a potential difference across the terminals 170' will not result in current-flow through the heating element 184. If the switch 380 is actuated so as to cause the switch arm 388 to move to the contact 378, electrical current will flow through the electrical resistance heating element 184 and the bimetal heater element 374. If the switch arm 388 moves to the contact 384, electrical current will flow through the electrical resistance heating element 184, but not through the bimetal heater element 374.

Figure 15:
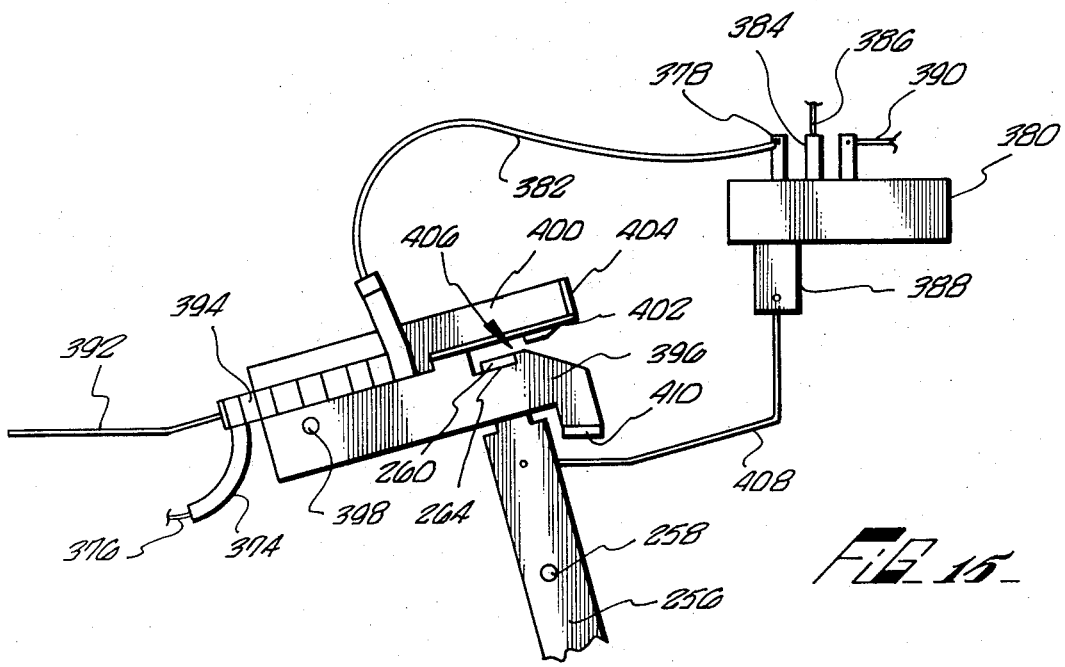
FIG. 15 is a view, in elevation, of the portion of the cooking apparatus illustrating an alternate embodiment of latching mechanism according to FIG. 16.

FIG. 15 is a view, in elevation, of the switch 380 and associated circuitry schematically illustrated in FIG. 14. The apparatus shown in FIG. 15 corresponds to that shown in FIGS. 6 through 9, and is an alternate embodiment thereof. As bimetallic strip 392 is fixed, with respect to the apparatus frame, by any appropriate mounting structure. The bimetallic strip 392 has the bimetallic heater element 374 wrapped around a portion thereof and insulated therefrom by a mica wrapping 394. When electrical energy is applied to the bimetallic heater element 374, the bimetallic strip 392 will become heated, and bend downwardly so that the end remote from the point of attachment to the frame will move in a clockwise direction. A latch 396, generally similar in construction to the latch 250 shown in FIGS. 6 through 9, engages the latch lever 256. The latch 396 is mounted about a pivot 398 which serves the same function as the pivot 252. The latch 396 is spring biased to pivot in a counterclockwise direction in the same manner as the latch 250. A secondary latch 400 is also mounted on the pivot 398 and is spring biased to rotate in a clockwise direction.

In the disposition shown in FIG. 15, clockwise rotation of the secondary latch 400 is limited by the engagement of a tip portion 402 of the bimetallic strip with a secondary latch arm 404. The secondary latch 400 has a secondary latch recess 406 formed therein adjacent the secondary latch arm 404. The latch lever 256 is connected to the switch arm 388 by an actuator link 408 which passes through appropriate apertures formed in the latch lever 256 and switch arm 388. The switch arm 388 may move between three positions. In the position shown in FIG. 15, for example, electrical continuity exists between the conductor 390 and the conductor 382. Clockwise rotation of the latch lever 256 causes the switch arm 388 to move to the right, opening circuit continuity between conductor 390 and conductor 382 and establishing electrical circuit continuity between the conductor 390 and the conductor 386. Further clockwise rotation of the latch lever 256 opens circuit continuity between the conductor 390 and the conductor 386 by reason of the further movement of the switch arm 388 to the right. Thus, the three positions referred to with respect to FIG. 14 for the switch 380 are achieved by the lateral movement of the switch arm 388 in response to the clockwise rotation of the latch lever 256.

In operation, the latch lever 256 and latch 396 assume the position shown in FIG. 15 by reason of the cooking tray being inserted in the cooking apparatus and raised to the position shown in FIG. 4. Electrical circuit continuity exists between the conductor 390 and the conductor 382, causing electrical current to flow through the bimetallic heater element 374 and the electrical resistance heating element 184. Current flow through the bimetallic heating element 374 heats the bimetallic strip 392, causing the bimetallic strip tip portion 402 to move downwardly in a clockwise direction, permitting the secondary latch 404 to also move downwardly in response to its spring bias so that the secondary latch 404 overlies the latch arm 260. However, as will be noted, the secondary latch recess 406 is greater in width than the latch recess 264 in the latch 396, so that the secondary latch recess does not, upon contact, exert a latching effect on the latch arm 260. Continued heating of the bimetallic strip 392 by the bimetallic heater element 374 produces further downward movement of the tip portion 402. However, the secondary latch 400 is restrained from further downward movement by contact, within the latch recess, with the latch arm 260.

The bimetallic strip tip portion 402 continues its downward clockwise movement while being heated, so as to engage a latch release arm 410 on the latch 396. Further downward deflection of the tip portion 402 moves the latch 396 in a counterclockwise motion, releasing the latch arm 260 from the latch recess 264 of the latch 396. The latch lever 256 then rotates in a clockwise direction until the latch arm 260 is restrained by the latch recess 406. This limited clockwise rotation of the latch lever 256 is transmitted through the actuator arm 408 to the switch arm 388 causing the switch arm 388 to move to the right, breaking electrical circuit continuity to the bimetallic heater element 374, while maintaining electrical current flow through the electrical resistance heating element 184 by reason of completing electrical circuit continuity from the conductor 390 through the contact 384 to conductor 386.

As electrical current no longer flows through the bimetallic heater element 374, the bimetallic strip 392 cools, causing the tip portion 402 to move upward in a counterclockwise direction. Ultimately, the tip portion 402 contacts the secondary latch arm 404, and further upward movement of the tip portion 402 moves the secondary latch arm 404, and therefore the secondary latch 400, upward in a counterclockwise direction against the spring bias supplied thereto. This upward movement moves the secondary latch recess 406 upwardly away from the latch arm 260, which when free, permits the latch lever 256 to rotate further in a clockwise direction. The apparatus then assumes the disposition shown in FIG. 3 and the switch arm 388 is moved further to the right, opening electrical circuit continuity for the electrical resistance heating element 184, thereby terminating cooking.

Figure 16:
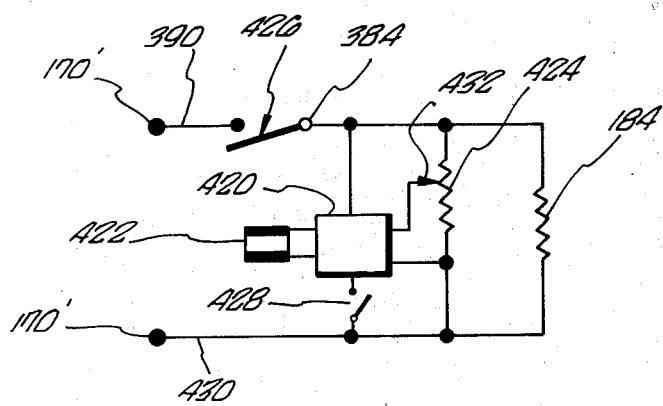
FIG. 16 is a schematic diagram of another alternate embodiment of electrical circuitry for the cooking apparatus.

FIG. 16 is a schematic diagram of another alternate embodiment of electrical circuitry for the cooker. In FIG. 16, a timer 420 is utilized to actuate a solenoid 422 in order to open electrical circuit continuity for the electrical resistance heating element 184. The timer 420 is of any conventional adjustable type, and is shown for purposes of illustration in FIG. 16 as having the duration of its time interval controlled by a time control potentiometer 424. In the operation of the embodiment of FIG. 16, electrical circuit continuity for the electrical resistance heating element is initially established by closing a switch 426 so as to cause electrical current to flow through the electrical resistance heating element 184. As the embodiment of FIG. 16 does not make use of a bimetallic strip, and so does not automatically compensate for the temperature of the apparatus when electrical energy is supplied to the electrical resistance heating element, a thermostat 428, which may close, for example at 225° Fahrenheit, is connected between a conductor 430 and the timer 420. Thus, the timer is not energized until the thermostat closes. The duration of the time interval for the timer 420 is pre-selected by appropriate adjustment of the potentiometer 424. The potentiometer 424 has a control arm 432 which is rotated by the heat control knob 112, the control arm 432 corresponding to the stem 148 of FIG. 11, and the potentiometer body corresponding to the camming surface 152. Upon the passage of the pre-selected time after energization of the timer 420, the timer 420 actuates the solenoid 422, causing the switch 426 to open, so as to break electrical circuit continuity between the input terminals 170' with respect to the electrical resistance heating element 184, the timer 420, and the solenoid 422. Thus, the solenoid 422 is actuated only momentarily, sufficient to break the electrical circuit, whereupon the solenoid is immediately deactuated.

Figure 17:
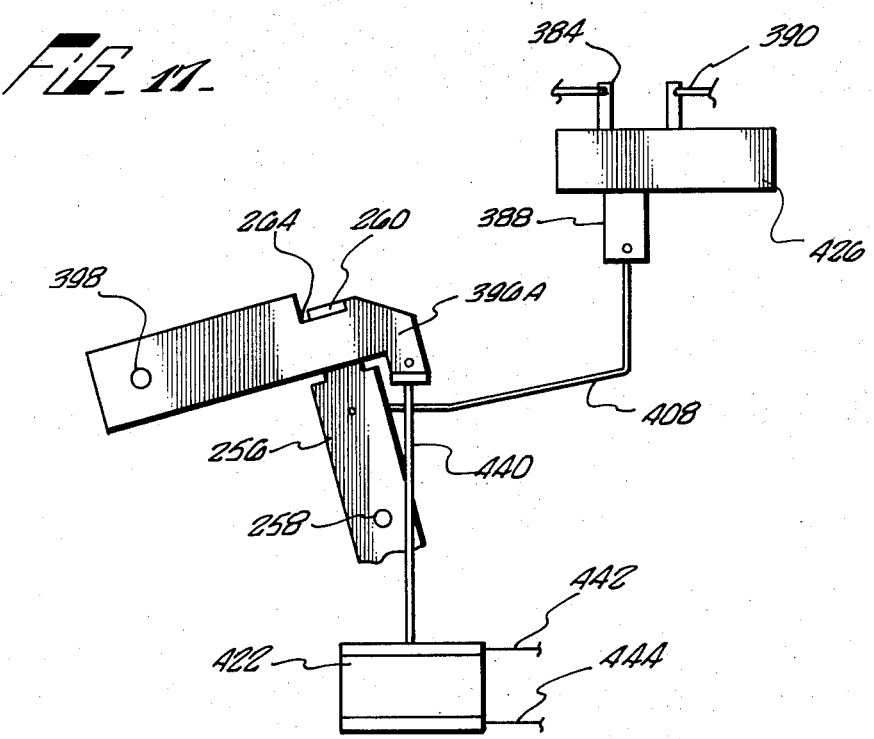
FIG. 17 is a view, in elevation, of the portion of the cooking apparatus illustrating an alternate embodiment of latching mechanism according to FIG. 16.

The embodiment of FIG. 16 does not use a bimetallic strip mechanism to compensate for the temperature of the apparatus at the start of the cooking cycle. Therefore, the thermostat 428 is utilized in order to provide for an extended cooking interval if the apparatus is not operating at its normal cyclical temperature. Thus, from a cold start, a greater cooking period is required in order to provide the same amount of doneness as compared to the time interval required if the apparatus had just completed a cooking cycle. With the particular construction shown in FIGS. 1 through 5, the bimetallic strip and associated circuitry automatically compensate for the temperature of the apparatus as the start of any given cooking cycle, acting as a combined timer and thermostat. When the timer embodiment of FIGS. 16 and 17 is utilized, so as not to include the bimetallic strip, a second thermostat mounted in the space above that which would have been occupied by the bimetallic strip, and having the characteristic of closing at a temperature of about 225° Fahrenheit will properly compensate for the temperature of the apparatus at the completion of the particular cooking interval. In repeated cyclical operation, the temperature within this space does not fall below 230° Fahrenheit unless a prolonged interval elapses with the apparatus in the disposition shown in FIG. 3, as will be seen in FIG. 18. Alternatively, the second thermostat can be located in the area above the cooking element occupied by the thermostat 195. This second thermostat, for the construction shown, should close at about 300° Fahrenheit to properly compensate for cold start cooking.

FIG. 17 is a view of the latching mechanism of the embodiment of FIG. 16. A latch 396A corresponds generally to the latch 396 of FIG. 15, except that the latch release arm 410 is replaced by an aperture, through which a solenoid actuator arm 440 passes. The solenoid actuator arm 440 is connected to the solenoid 422. In the disposition shown in FIG. 17, the tray has been inserted into the cooking apparatus and moved upwardly to the disposition shown in FIG. 4. The latch 396A thus retains the latch arm 260 in the latch recess 264. Upon the passage of the time interval for which the timer 420 has been set by means of the potentiometer 424, the timer 420 applies an actuating potential to the solenoid 422 through a pair of leads 422, 444, causing the solenoid 422 to become energized and to pull downwardly on the solenoid actuator arm 440. The downward pull on the latch 396 by the solenoid actuator arm 440 causes the latch 396A to pivot in a clockwise direction, releasing the latch arm 260 from the latch recess 264. The latch lever 256 then rotates in a clockwise direction, causing the switch contact arm 388 to move to the right, so as to open the circuit continuity which previously existed between the conductor 390 and the contact 384 so as to terminate cooking.

Figure 18:
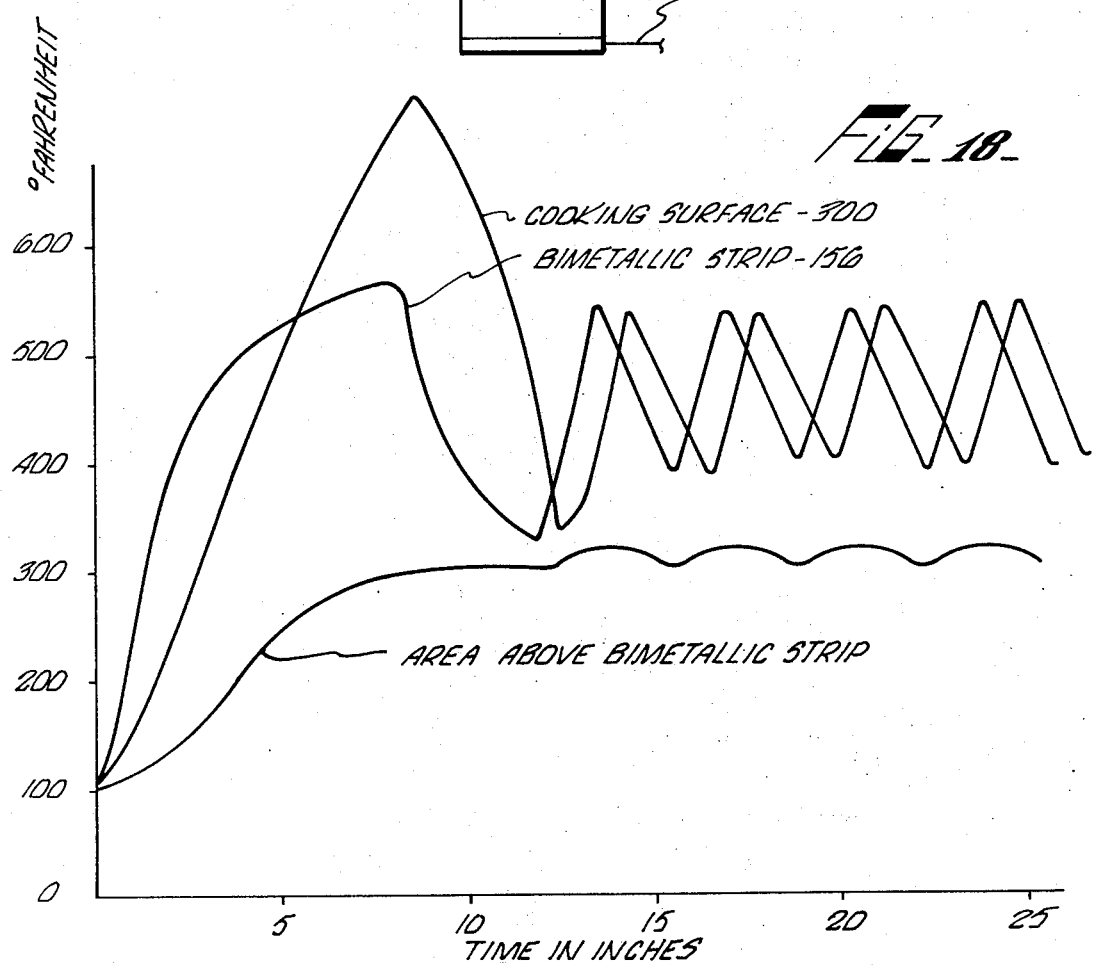
FIG. 18 is a graph illustrating typical temperature characteristics during operation for the cooking apparatus of FIGS. 1 through 13.

Referring now to FIG. 18, there is shown in graphical form the temperatures which exist in the device of FIGS. 1 through 5 during a series of cooking operations commencing from a cold start condition. Temperatures at three positions within the apparatus are shown, i.e., the temperature of the lower face of cooking surface 300, the temperature of the bimetallic strip 156, and the temperature of the area above the bimetallic strip. The temperature of the area above the bimetallic strip is shown in order to show the conditions which exist if the embodiment of FIGS. 16 and 17 is used, necessitating a separate second thermostat rather than the combined thermostat and timer which is provided by the bimetallic strip and its associated circuitry.

Upon starting from a cold start condition, the bimetallic strip and cooking surface heats rapidly, whereas the area above the bimetallic strip, not being directly heated by the electrical energy, heats more slowly. As will be seen in FIG. 18, the temperature peak of the bimetallic strip always leads the temperature peak of the cooking surface for a given cycle. The temperature peak of the area above the bimetallic strip generally lags slightly behind the temperature peak for the bimetallic strip, but leads the temperature peak for the cooking surface. These phase relationships will be apparent by reason of the termination of heating of the bimetallic strip prior to termination of heating of the cooking surface, and the fact that the area above the bimetallic strip is heated principally by radiation and convextion.

As was mentioned heretofore, it may be desirable, in certain embodiments, to utilize a second thermostat located in the area above the cooker 320, that is, the area in which the thermostat 195 is located. The temperature variation in this area generally resembles the temperature variation in the area above the bimetallic strip, except that the temperature minimum during cyclical operation is slightly above 300° Fahrenheit. Thus, it will be seen that, insofar as the thermostat aspects of the bimetallic strip are concerned, the function of the thermostat is to provide for an extended initial cooking period when the apparatus is energized either from a cold start condition or from a condition in which the temperature within the apparatus has dropped below that which normally exists by reason of cyclical operation. By providing such an extended cooking period, the material being cooked is cooked to the desired degree of doneness, i.e., the same degree of doneness as is accomplished when cooking is carried out on a cyclical basis in which the apparatus does not cool off greatly between cycles.

From the foregoing description it will be apparent that, in addition to its apparatus aspects, the present invention includes method aspects. Thus, according to the present invention, a method for cooking meat comprises the steps of supporting at least one piece of meat on a first member, of a structure such that grease cooked from the meat may pass through the supporting surface thereof, compressing the meat between the first member and a second member with a pressure sufficient to prevent longitudinal contraction of the meat during cooking, while so compressing the meat heating the second member for a predetermined time to cook the meat, and separating the first and second members and removing the meat from the first member. Additionally, in its method aspects, the present invention contemplates, in a particular embodiment, covering the first member with a removable cover of a grease absorbing material prior to disposing the meat thereon, and removing the meat and removable cover from the first member after cooking.

The operation of the apparatus shown in FIGS. 1 through 17 has been described generally with respect to the description of the figures. In summary, bacon strips 128 are disposed upon the tray 118, preferably upon a layer of absorbent paper 130, which is placed as a removable cover over the rack 126. The tray 118 is then moved upwardly into the position shown in FIG. 4, so that the bacon strips actually support the cooking element 320. The cooking surface 300 is heated, causing the bacon to be cooked, and grease therefrom to pass into and through the paper layer 30 and the apertures formed in the rack 126, into the space between the rack 126 and the base portion 330. The cooking element 320 is designed to have a weight such that, the bacon or other material being cooked is compressed between the cooking element 320 and the tray 118 by reason of the weight of the cooking element 320. Contraction of the material being cooked during cooking, other than as to thickness, thereby is inhibited. Preferably, if bacon is being cooked, the bacon, when cooked, has substantially identical dimensions, other than thickness, after cooking as before cooking. By maintaining this identity of dimensions, the bacon is given a texture which is superior to the texture ordinarily existing in bacon which is cooked in a conventional manner.

Furthermore, bacon cooked in accordance with the present invention has been found to lose, in a given instance, 75 percent of its original weight during cooking. This weight loss represents the weight of flat cooked from the bacon and no longer present when the bacon is consumed. Thus, in the practice of the present invention, the ultimate consumer of the material being cooked avoids consuming a large proportion of flat together with the meat being consumed.

By adjustment of the control knob 112, the particular degree of doneness to which the bacon is cooked is controlled by controlling the duration of cooking time, so that the particular tastes of the ultimate consumer as to degree of doneness may be satisfied. Upon completion of cooking to the desired degree of doneness, the apparatus of the present invention automatically releases the tray, so that the tray falls away from the cooking element to stop further cooking.

The desirability of the removal of the material being cooked from the cooking element upon completion of the controlled time cycle is indicated in FIG. 18 by the fact that the cooking surface 300 remains at a temperature sufficient to continue cooking for a period of time after the predetermined time interval has elapsed. By way of example of a time interval for cooking after cyclical operation has been established, the time required for engagement of the magnet and bimetallic strip may be 1.75 minutes and the time for cooling of the bimetallic strip to produce unlatching may be 1 minute. These times, together with the time to load the bacon into the apparatus and remove the bacon from the apparatus, give a typical cyclical time of 4 minutes overall.

The invention claimed is

1. In an apparatus for cooking, the combination of:
a frame;
a hollow tray for receiving foodstuffs to be cooked said tray having a removable upper foodstuff holding surface adapted to permit the passage therethrough into the tray's interior of grease cooked from said foodstuff;
cooking means disposed in the upper portion of the frame and including a foodstuff contacting, horizontal cooking surface facing downwardly toward the bottom of the frame;
support means connecting the frame, the tray and the cooking means so as to permit limited movement of said cooking means and independent relative movement of the tray with respect to the cooking means between:
  a. a first position, in which the tray is remote from the cooking surface for receiving a foodstuff to be cooked and holding same after cooking, and
  b. a second position, in which the tray is disposed under and immediately adjacent to the cooking surface positioning the foodstuff in direct contact with the cooking surface for cooking of said foodstuff,
said support means including pivotal linkage means connected between said tray and said frame for moving said tray inwardly and upwardly toward and downwardly and outwardly from said cooking means to each of the said two positions while maintaining said tray horizontally disposed at and in between both said positions such that, when the apparatus is in the second position, the cooking surface is supported directly and primarily by the foodstuff to be cooked and, when in the first position, the foodstuff which has been cooked is retained on said tray but is remote with respect to the cooking surface to stop further cooking;
means including pivoted means connected to and actuated by movement of said pivotal linkage means operable in response to the change in tray disposition from the first position to the second position to initiate heating of the cooking surface to cook said foodstuff;
means for releasably retaining said support means and said tray in said second position;
means automatically operable in response to expiration of a pre-selected period of controlled heating to release said retaining means to enable said pivotal linkage means to move the tray from its first position to its second position and thus terminate cooking of the foodstuff while retaining the cooked foodstuff on the tray.

2. The combination of claim 1 and including manually actuated control override means, said override means being operable when actuated to terminate cooking and initiate relative movement of the apparatus from its second to its first position.

3. The combination of claim 2, and including a layer of grease absorbent material covering the tray surface and upon which the material to be cooked is placed.

4. An automatic bacon cooker comprising:
a frame;
a bacon support tray having a hollow interior and a removable upper surface on which the bacon to be cooked is laid in flat strip form, said upper surface having a plurality of grease drainage passages to permit flow of bacon drippings through said surface into the interior of said tray;

pivoted, parallel means connected between the frame and said tray for supporting the bacon tray in a horizontally disposed first position to receive bacon to be cooked and to hold cooked bacon in a position for removal from the cooker after cooking thereof, and in a second horizontally disposed position above the said first position for cooking;

a cooking means, said means including heating elements and a downwardly facing, horizontal cooking surface disposed below said heating elements for direct contact with bacon strips on said upper surface of said tray;

means for supporting said cooking means in the frame for limited vertical movement relative thereto to permit movement of the cooking tray toward a position adjacent to the cooking means with said bacon strips being placed in direct contact with the downwardly facing cooking surface so that the cooking means is supported primarily by bacon strips to be cooked on said tray when the tray is in said second position, said cooking being supported solely by the frame remote from the tray when the tray is in said first position;

control means actuated by said pivoted parallel supporting means for said tray upon movement of said tray to the second position to energize the heating elements to heat said cooking surface, said control means including manually settable means for continuing energization of said heating elements for a controlled time interval and, further including releasable latch means connected between said pivoted parallel supporting means for said tray and said frame holding said tray in said second position automatically operable upon passage of said, controlled time interval and means operably connecting said latch means and said settable means to release said latch means and thereby permit movement of the tray and cooked bacon from its second position to its first position simultaneously with de-energization of said heating elements.

5. A cooker as described in claim 4, and including a tray lower surface spaced from the tray upper surface and fixed with respect thereto so as to form a grease receiving tray portion therebetween.

6. A cooker as described in claim 5, and in which the tray upper surface is resilient.

7. A cooker as described in claim 6, and in which the tray upper surface is rigid, and the cooking surface is supported by the bacon on the cooking tray when the cooker is in its second position.

8. A cooker as described in claim 7, and including at least one layer of absorbent material on the surface of the tray, upon which the bacon rests during cooking.

9. A cooker as described in claim 8, and in which the absorbent material is paper, and is removable from the tray for disposal and replacement after each cooking cycle.

* * * * *

UNITED STATES PATENT OFFICE
CERTIFICATE OF CORRECTION

Patent No. 3,824,916                    Dated July 23, 1974

Inventor(s) SHERMAN B. GREEN, CHARLES K. GREEN, JACK L. GLANCY, FLOYD J. MYRICK, CARL WILLIAM NORLANDER, RODNEY E. SMITH It is certified that error appears in the above-identified patent and that said Letters Patent are hereby corrected as shown below:

| | |
|---|---|
| Col. 1, line 30 | "good" should read --food-- |
| Col. 2, line 12 | "illiustrates" should read --illustrates-- |
| Col. 2, line 53 | after "cover 106" insert --top.-- |
| Col. 5, line 49 | "the flange" should read --a flange-- |
| Col. 6, line 34 | "The downward" should read --the downward-- |
| Col. 11, line 11 | "As" should read --A-- |
| Col. 13, line 27 | "as" should read --at-- |
| Col. 13, line 59 | "leads 422,444," should read --leads 442, 444,-- |
| Col. 15, line 36 | "flat" should read --fat-- |
| Col. 15, line 40 | "flat" should read --fat-- |

Signed and sealed this 21st day of January 1975.

(SEAL)
Attest:

McCOY M. GIBSON JR.
Attesting Officer

C. MARSHALL DANN
Commissioner of Patents